US006230868B1

(12) United States Patent
Tuxen et al.

(10) Patent No.: US 6,230,868 B1
(45) Date of Patent: May 15, 2001

(54) SYSTEM FOR METERING MULTIPLE PARKING SPACES

(75) Inventors: Gorm Tuxen, Ridgedale, MO (US); J. Michael Rodgers; Todd Magness, both of Harrison, AR (US); Paul Descombes, Jasper, AR (US); Ralph H. Carmen, Meritt Island, FL (US)

(73) Assignee: Duncan Industries, Inc., Harrison, AR (US)

(*) Notice: Subject to any disclaimer, the term of this patent is extended or adjusted under 35 U.S.C. 154(b) by 0 days.

(21) Appl. No.: 09/506,867

(22) Filed: Feb. 8, 2000

(51) Int. Cl.[7] .............................. G06F 19/00; G07F 9/10; B60Q 1/48

(52) U.S. Cl. ......................... 194/217; 194/350; 340/932.2

(58) Field of Search .................................... 194/217, 350; 368/7, 90, 92; 340/932.2; 705/418

(56) References Cited

U.S. PATENT DOCUMENTS 5,065,156 * 11/1991 Bernier .............................. 340/932.2
5,617,942 4/1997 Ward, II et al. ..................... 194/217
5,732,812 * 3/1998 Grainger et al. ...................... 194/217
5,805,083 9/1998 Sutton et al. ........................ 194/217
5,841,369 11/1998 Sutton et al. ..................... 340/932.2
5,845,268 * 12/1998 Moore .................................. 705/418
6,099,401 * 8/2000 Perkitny .................................. 453/9

* cited by examiner

*Primary Examiner*—Robert P. Olszewski
*Assistant Examiner*—Bryan Jaketic
(74) *Attorney, Agent, or Firm*—Piper Marbury Rudnick & Wolfe

(57) ABSTRACT

A parking meter system consisting of a cylindrical housing having an upper section for a driver assistance display, control buttons, payment means and a time display. The housing is located adjacent a plurality of parking spaces and a single parking meter mechanism is mounted within the housing for controlling parking for each of the plurality of spaces. A separate enforcement display is located on the street side of the housing so that an enforcement officer can observe the compliance status without leaving his vehicle. The housing also supports a coin collection canister in a lower section thereof and access doors are provided for both the upper and lower housing sections for ease of servicing. The contours of the doors preserves the cylindrical housing shape when the doors are closed.

12 Claims, 3 Drawing Sheets

SYSTEM FOR METERING MULTIPLE PARKING SPACES

BACKGROUND OF THE INVENTION

This invention relates to the control of parking and, in particular, to a system of the type wherein a parking meter is located proximate a parking space with the driver of the vehicle depositing coins in the meter or using other payment means such as a debit card after parking a vehicle in the space. Typically, the meter will be mounted on a stanchion located at a particular parking space and a single stanchion is often used for supporting each meter. In some instances, the same stanchion may be used for supporting two or more meters with each of the meters on the stanchion being assigned to a single parking space adjacent the stanchion.

In an attempt to minimize cost both in terms of the number of individual meters required and the number of stanchions required, and in order to improve the street appearance, proposals have been made to employ the same system for controlling more than one parking space rather than requiring a single meter for each space. Telkor and International Parking Systems have developed housings adapted to be located on the street for controlling multiple parking spaces. These housings include display panels with instructions for designating the space being used and depositing required payments.

A multi-bay parking meter described in U.S. Pat. No. 5,617,942 illustrates another arrangement of this type. In this instance it is proposed that a single electronic parking meter be mounted on a supporting stanchion but that the meter be programmed to permit the control of two or four separate parking spaces. The standard display window for the meter would be used as the means for advising the driver of the status of the respective spaces.

SUMMARY OF THE INVENTION

This invention provides for the use of a housing adapted to be located on the street for use in controlling parking at two or more spaces. The housing includes a mounting area for a single electronic parking meter mechanism and large display panels, separate from the mechanism, for instruction of drivers and for display of meter status. Control buttons are accessible to the driver and coin and card deposit means are available for use when the driver has operated the control buttons to indicate the parking space selected.

The mounting area for the meter mechanism, the displays, control buttons and deposit means are located in an upper section of the housing. A lower housing section supports coin cans for use with a collection system and a coin return means is provided so that coins deposited at the wrong time, or invalid coins, will not be collected. The housing design is such that very high security is achieved since there are no areas where easy access to the lower housing can be obtained. The upper housing is designed for minimum susceptibility to vandalism. The combined upper and lower housing sections provide an aesthetically pleasing appearance, and since the need for a single stanchion for each parking space is eliminated, the overall street appearance is enhanced when the concepts of this invention are employed.

Since only a single meter mechanism is required for multiple spaces, the cost for parking enforcement is reduced. Furthermore, maintenance is simplified since the mechanism can be easily replaced whenever service is required so that the downtime for any particular group of parking spaces will be minimal. Collection of revenues is also simplified since the revenue from several spaces is obtained in a single collection operation.

The meter mechanism is provided with peripheral port technology as described in U.S. Pat. No. 5,841,369 and an operating system as described in U.S. Pat. No. 5,805,083. With this arrangement, other devices such as communications systems and printers can be added to the system. Due to the housing design features which are separate and apart from the meter mechanism, the usual space constraints found with conventional stand alone parking meters are not encountered.

DESCRIPTION OF THE PREFERRED EMBODIMENT

Figure 1:
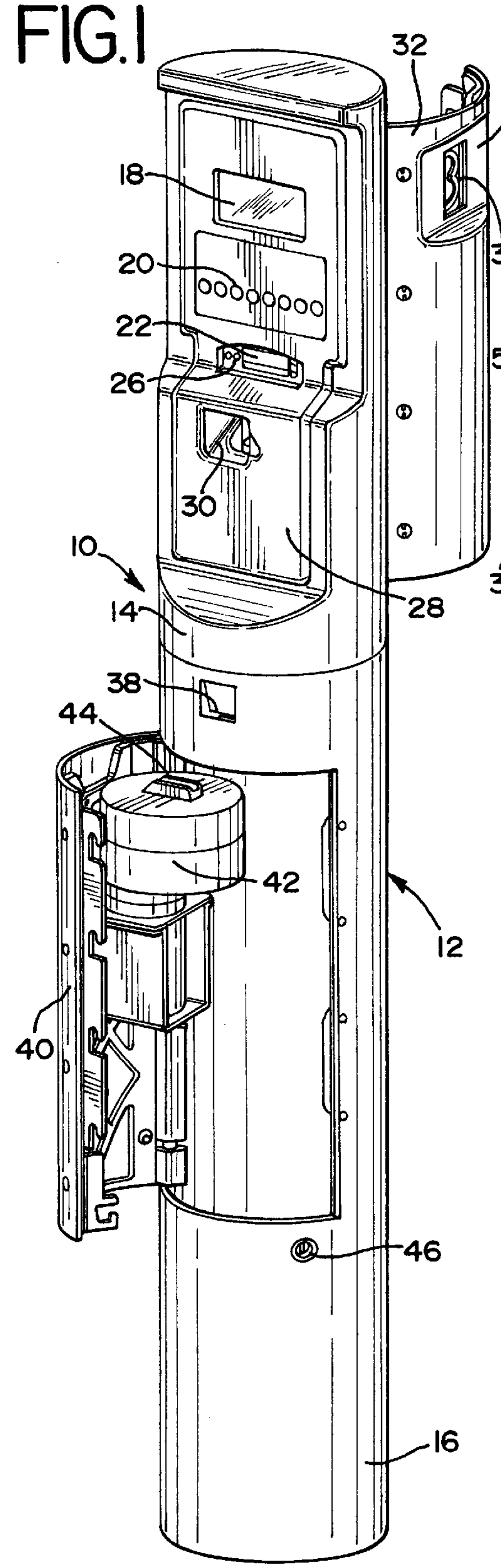
FIG. 1 is a front perspective view of the system of the invention for controlling multiple parking spaces.

FIG. 1 illustrates an electronic parking system 10 including housing 12 having upper housing section 14 and lower housing section 16. The front side of the upper section defines an essentially flat vertical face portion having a driver assistance display 18. Beneath this display there are located a plurality of buttons 20 with one button being provided for each parking space controlled by the system. An overhang 21 may be provided at the top of the upper section to minimize the collection of rain, snow or the like on this face.

Beneath the buttons, a window 22 is provided through which the upper portion of a parking meter mechanism 23 is visible. This upper portion includes the digital time display 24 carried by the mechanism (FIG. 3) and the infrared communication interface connections 26 which are used for programming, data collection and the like. A parking meter mechanism as described in U.S. Pat. No. 5, 841,369 may be used for this purpose as will be described in greater detail with reference to the other drawing figures.

The front side of the upper section also has a slightly forwardly positioned vertical face portion 28 which has a coin and card acceptor 30 positioned thereon. To the extent that other features may be added, such as a printer or additional communications means, any necessary controls therefore or access ports could be positioned on this face portion 28.

The upper section 14 of the housing is formed of a steel cylinder which is cut to form the illustrated indented portions and with steel pieces being welded in place to form the top and vertical surfaces as illustrated. A back side section of the cylinder is cut out and then hinged in place to form a rear door 32. This door defines a vertical face portion 34 which has enforcement display 36 positioned thereon. In a typical application, the housing will be located at the curb with the driver assistance display 18 on the sidewalk side so that the driver will stand on the sidewalk when using the system. The display 36, which preferably has substantially larger digital figures for ease of reading, will face the street side so that an enforcement official will be able to determine the compliance status of the meter by viewing from a vehicle.

The lower housing section 16 is also formed of a steel cylinder with coin return slot 38 positioned at the top of the cylinder. A cut out section forming door 40 is positioned beneath the coin return and, as with the door 32, the shape of this door, in vertical cross section, corresponds with the cylinder shape so that when the door is closed the cylindrical shape of the housing is retained. A coin collection canister 42 is supported on the inside of the door for easy access by an authorized individual. This collection canister may be of conventional design and includes top entry opening 44 for receiving coins that are accepted. High security lock 46 is provided so that access to the canister is restricted and is separated from the access to the upper section through rear door 32. This rear door is accessible by operating high security lock 47.

Figure 2:
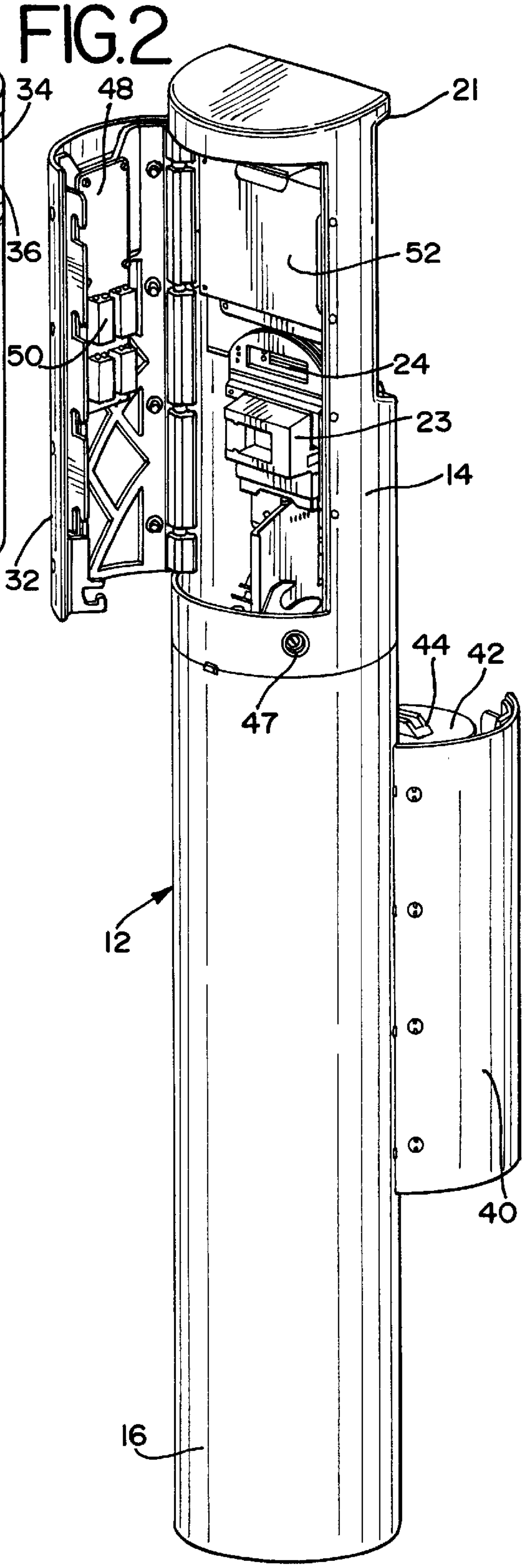
FIG. 2 is a rear perspective view of the system.

FIG. 2 illustrates the system housing from the rear. As shown, the rear door is used to support the PCB 48 for the enforcement display 36, and batteries 50 are also located in this position for easy replacement. Opposite the door, a PCB 52 is provided for the driver assistance display 18 and the control buttons 20.

The parking meter mechanism 23 is supported beneath the PCB 52. As already noted, this mechanism may be as described in the aforementioned '369 patent and will include digital display 24 and infrared communication 26. The mechanism can be readily installed and removed as desired since it is a self-contained unit with an operating system as described in the aforementioned '083 patent. All peripheral systems described are adapted to be controlled by this mechanism and only a single mechanism is required for the control of all of the parking spaces involved. The value of the system is enhanced by the fact that many municipalities already have mechanisms of this type purchased for use with the conventional mounting stanchions. It is, therefore, not necessary to purchase new mechanisms with the purchase of housings of the type described. Thus, the mechanisms 23 are readily programmable to function with the multi-space system.

Figure 3:
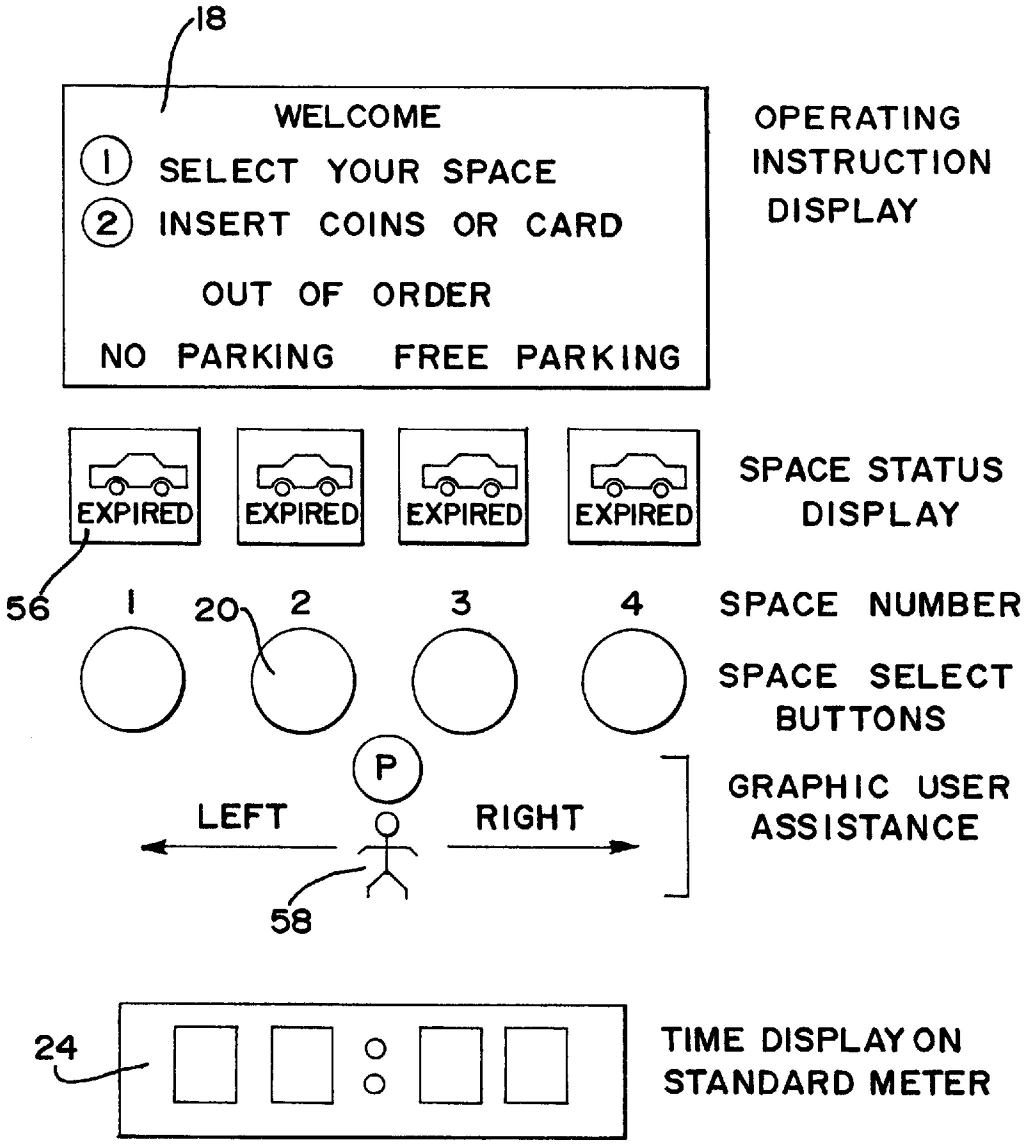
FIG. 3 is a diagrammatic illustration of the user interface display provided in the system; and, FIG. 4 is a diagrammatic illustration of the basic operating features of the invention.

The diagrammatic illustration in FIG. 3 shows the content of the driver assistance display 18 while also serving to illustrate the manner in which the system is used. Thus, when a driver has parked his car he exits the car and proceeds to the housing of the system 10 which will be located convenient the selected space and the several additional spaces controlled by that housing. Car icons 56 are lighted displays showing the status of each space controlled with the word EXPIRED being shown if a space is unoccupied or occupied but not paid for. A graphical map of the parking area will enable the driver to determine which of the spaces he has occupied and the driver is first asked by the instruction SELECT YOUR SPACE to press a button corresponding to that space. This map includes the icon 58 of a person to orient the driver relative to the system housing and the respective parking spaces to the left and right of the driver. Obviously, the map may take different forms depending on the particular arrangement of parking spaces.

Pressing a button causes one of the car icons to begin flashing and the instruction INSERT COINS or CARD is then displayed. If the driver failed to select a space before depositing coins, the coins will simply be returned and the driver will have the opportunity to repeat the sequence. When the coins have been inserted and accepted, the word EXPIRED is turned off for the selected space. In addition, the time display 24 provided by the meter mechanism 23 will display the time purchased for that space.

The enforcement or streetside display 36 may be simply a single number, of relatively large dimension such as 3 inches high or higher, indicating the number of spaces which are occupied and for which payment has been made. Thus, at the end of the payment sequence, the display 36 will increment by one, for example, from 3 to 4 to show that the additional occupied space has been accounted for. If the enforcement officer observes that there are more spaces occupied than indicated by this number, then the officer must leave his vehicle to observe the display 18. This will immediately provide an indication of which space or spaces are illegally occupied (by identifying either paid for or unpaid for spaces) and the officer can write tickets as is appropriate.

Figure 4:
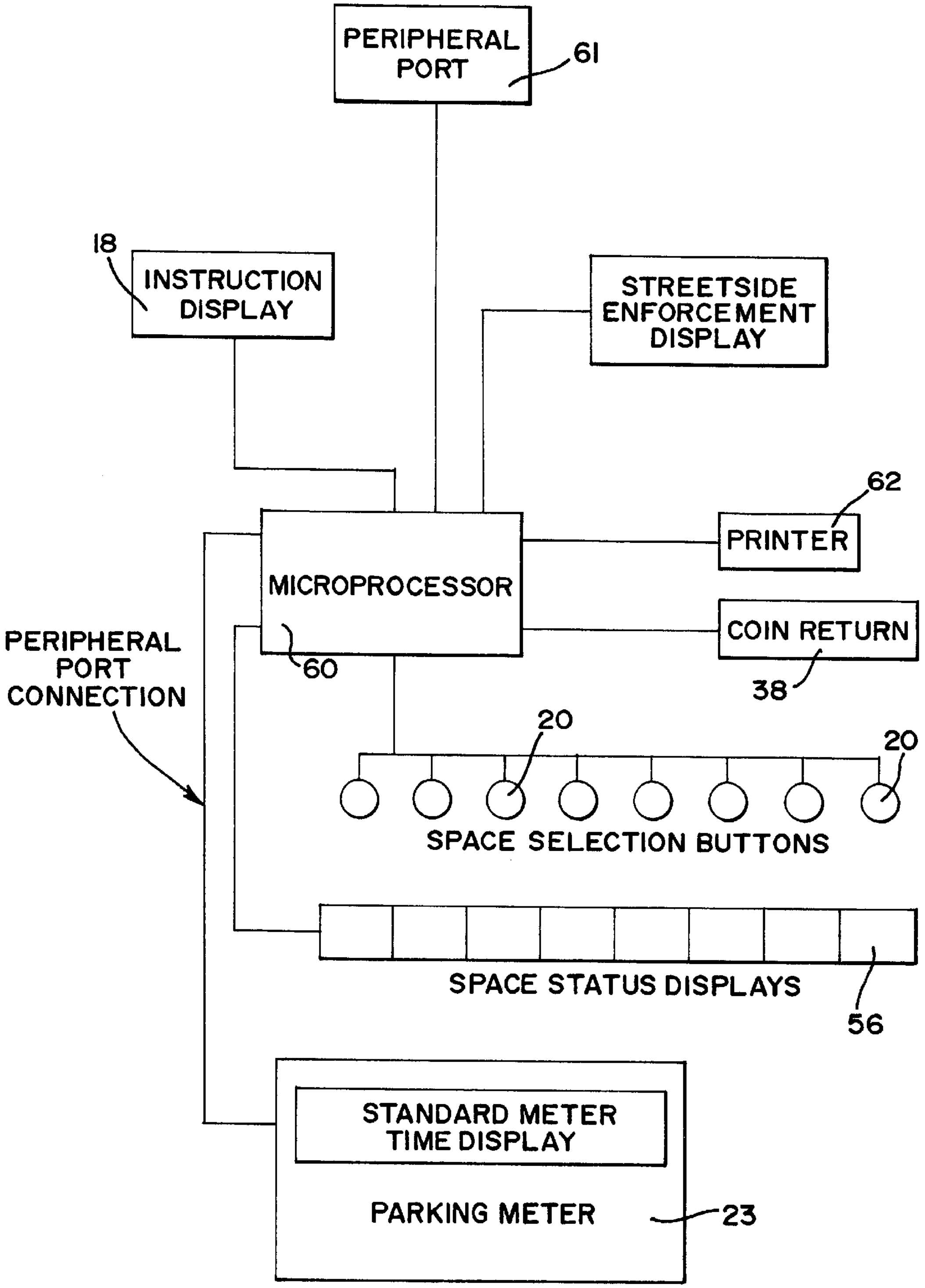

FIG. 4 is a diagrammatic illustration of the general features of the system. The microprocessor 60 is mounted on the PCB 52 and each of the buttons 20 is connected to this microprocessor. Activation of a button will initiate the described sequence for initially paying for a parking space. In addition, once time is purchased, activation of a button will provide for lighting of the space status display icon 56 and will display the time remaining for that space on the display 24 of the mechanism 23. The microprocessor will also control the coin return mechanism 38 which may be of any conventional design.

As illustrated, the system allows for the addition of other devices such as a printer 62 which could be used, for example, for printing of receipts to be obtained by the driver when parking a vehicle. It is also contemplated that the system with a printer could be used in a large parking lot or parking garage where, instead of inputting a space number, the driver would make payment and the printer would print a ticket which the driver would then display on the vehicle dashboard as proof of payment. Numerous other potential uses for the peripheral port are referred to in the aforementioned '369 and '083 patents.

In the embodiment of the invention shown in FIG. 4, the printer 62 is connected directly to the microprocessor for operation of the printer. A separate peripheral port 61 may also form part of the microprocessor for the attachment of other devices such as an electronic lock whereby the operation of the lock would be operated using the microprocessor upon the addition of suitable software as is explained in the aforementioned '369 patent. Other devices can also be "daisy chained" as explained in this patent.

The mechanism 23 preferably includes a peripheral port as is illustrated. In the operation of this system, coins or other payment means are used and the mechanism calculates the time purchased and then transmits the information to the microprocessor which is programmed to record the time remaining on two or more clocks provided by the microprocessor (eight clocks in the example illustrated in FIG. 4). Thereafter, the mechanism 23 will be able to display the time only when instructed to do so by the microprocessor in response to the activation of a button for a particular parking space.

In a typical embodiment, the system housing 12 will have a diameter of about 8 and ½ inches and a height of about 60 inches. This provides suitable space for receiving the mechanism 54 along with the other elements of the system and is a great improvement in that regard when compared with the typical parking meter housing employed for a mechanism 23. The cylindrical contour, in addition to being aesthetically acceptable, is a deterrent to vandalism since there are no available entries for prying open the housing.

It will be understood that various changes and additions may be made to the system described without departing from the spirit of the invention particularly as set forth in the following claims.

That which is claimed is:

1. A parking meter system of the type wherein a parking meter mechanism having a time display is located in a housing and wherein the housing is located adjacent to a plurality of parking spaces, said mechanism being adapted to control parking for all of said plurality of spaces, said housing having a driver assistance display, control buttons and payment means on one side, said time display also being observable on said one side, and an enforcement display on the opposite side whereby the driver utilizes the one side for achieving payment for parking time while an enforcement officer is able to observe compliance from the opposite side, and wherein said parking meter mechanism is provided with a peripheral port, a microprocessor located in said housing and connected to said peripheral port, said driver assistance display, said control buttons and said enforcement display being connected to said microprocessor, and wherein said time display of said mechanism is controlled by said microprocessor by means of communication through said peripheral port of the mechanism.

2. A parking meter system according to claim 1 wherein said housing carries a pivoting door on said opposite side, said enforcement display being mounted on said pivoting door.

3. A parking meter system according to claim 2 including power supply means for the system mounted on said pivoting door.

4. A parking meter system according to claim 2 wherein said mechanism is removably supported within said housing, said mechanism being accessible through said pivoting door.

5. A parking meter system according to claim 4 wherein said one side of said housing defines a window through which the time display of the mechanism is observable.

6. A parking meter system according to claim 1 wherein said housing defines a lower section, a coin acceptance canister supported in said lower, and a coin return means positioned intermediate said payment means and said coin acceptance means.

7. A parking meter system according to claim 6 wherein said lower section carries a second pivoting door, said coin acceptance canister being mounted on said second door whereby the canister is accessible when the second door is opened.

8. A parking meter system according to claim 1 wherein said housing comprises a vertically positioned cylinder formed of high strength material.

9. A parking meter system according to claim 8 wherein said cylinder is formed in two sections comprising an upper section and a lower section, said upper section defining a flat vertical face providing the location for said driver assistance display, control buttons, payment means and time display.

10. A parking meter system according to claim 9 including a first pivoting door in said upper section opposite said vertical face whereby access to the interior of the housing in the area behind said vertical face is provided, said door having a vertical cross section corresponding to the shape of said cylinder whereby the shape is retained when the door is closed, and including a second pivoting door in said lower section whereby access to the interior of the lower section is provided, said second door having a vertical cross section corresponding to the shape of said cylinder whereby the shape is retained when the second door is closed.

11. A parking meter system according to claim 1 including a printer mounted in said housing and connected to said microprocessor.

12. A parking meter system according to claim 1 including a separate peripheral port connected to said microprocessor for connection of devices to be controlled by the microprocessor other than said mechanism.

* * * * *